(12) United States Patent
Vigeant

(10) Patent No.: US 12,054,079 B2
(45) Date of Patent: Aug. 6, 2024

(54) RECLINABLE SEAT WITH MULTIPLE CONFIGURATIONS

(71) Applicant: BOMBARDIER INC., Dorval (CA)

(72) Inventor: Jérôme Vigeant, Montréal (CA)

(73) Assignee: BOMBARDIER INC.

( * ) Notice: Subject to any disclaimer, the term of this patent is extended or adjusted under 35 U.S.C. 154(b) by 118 days.

(21) Appl. No.: 17/961,659

(22) Filed: Oct. 7, 2022

(65) Prior Publication Data

US 2023/0111420 A1 Apr. 13, 2023

Related U.S. Application Data

(60) Provisional application No. 63/253,771, filed on Oct. 8, 2021.

(51) Int. Cl.
*B60N 2/23* (2006.01)
*B64D 11/06* (2006.01)

(52) U.S. Cl.
CPC .............. *B60N 2/23* (2013.01); *B64D 11/064* (2014.12)

(58) Field of Classification Search
CPC ................................ B60N 2/23; B64D 11/064
See application file for complete search history.

(56) References Cited

U.S. PATENT DOCUMENTS

| | | | |
|---|---|---|---|
| 3,540,777 A | 11/1970 | Beaumont | |
| 3,622,202 A | 11/1971 | Brown | |
| 2,073,872 A | 3/1973 | Kliesrath | |
| 3,819,229 A | 6/1974 | Rogers, Jr. et al. | |
| 6,247,753 B1 | 6/2001 | Alvestad | |
| 6,494,536 B2 | 12/2002 | Plant | |
| 8,419,123 B2 | 4/2013 | Hankinson et al. | |

(Continued)

FOREIGN PATENT DOCUMENTS

| CA | 2213760 C | 3/1998 |
|---|---|---|
| DE | 102010033752 A1 | 2/2012 |

(Continued)

OTHER PUBLICATIONS

International Searching Authority, PCT International Search Report and Written Opinion dated Apr. 15, 2019 re: International Application No. PCT/CA2018/051614.

(Continued)

*Primary Examiner* — Anthony D Barfield
(74) *Attorney, Agent, or Firm* — NORTON ROSE FULBRIGHT CANADA

(57) ABSTRACT

A reclinable passenger seat includes a seat pan linear actuator having a rear end pivotally connected to the rear end of the seat pan frame, and a front end pivotally connected to the base by a third fixed pivot. A backrest linear actuator has an upper end pivotally connected to the upper backrest member, and a lower end pivotally connected to the base. A length of the backrest linear actuator is defined between the upper and lower ends. The backrest frame and seat pan frame are configured to move simultaneously between at least a reclined configuration and a berth configuration through pivoting motion about the first and second fixed (Continued)

pivots and about the first and second locations. The length of the backrest linear actuator is substantially the same in the reclined configuration and in the berth configuration.

30 Claims, 7 Drawing Sheets

(56) References Cited

U.S. PATENT DOCUMENTS

| | | | |
|---|---|---|---|
| 9,073,453 B2 | 7/2015 | Erhel | |
| 9,592,914 B2 | 3/2017 | Erhel | |
| 9,714,095 B2 | 7/2017 | Erhel | |
| 9,714,862 B2 | 7/2017 | Erhel | |
| 11,186,374 B2* | 11/2021 | Erhel | B64D 11/0641 |
| 2009/0021065 A1 | 1/2009 | Brauning | |
| 2013/0256456 A1 | 10/2013 | Malek et al. | |
| 2015/0008707 A1 | 1/2015 | Erhel | |
| 2016/0325837 A1 | 11/2016 | Erhel et al. | |
| 2016/0325838 A1 | 11/2016 | Erhel | |
| 2017/0275003 A1 | 9/2017 | Erhel et al. | |
| 2018/0086468 A1* | 3/2018 | Beroth | B60N 2/23 |

FOREIGN PATENT DOCUMENTS

| | | | |
|---|---|---|---|
| EP | 1230876 A1 | 8/2002 | |
| EP | 1366987 A1 | 12/2003 | |
| EP | 3222523 A1 | 9/2017 | |
| FR | 3042172 A1 | 4/2017 | |
| JP | H0568800 U | 9/1993 | |
| JP | H0582337 U | 11/1993 | |
| JP | H07250729 A | 10/1995 | |
| JP | 2000085424 A | 3/2000 | |
| JP | 2015012909 A | 1/2015 | |
| WO | 2008083952 A1 | 7/2008 | |
| WO | 2015136735 A1 | 9/2015 | |

OTHER PUBLICATIONS

English translation of Japan patent document No. JP 2000085424A dated Mar. 28, 2000, https://patents.google.com/patent/JP2000085424A/en?oq=JP2000085424A, accessed on Jun. 22, 2020.

English translation of France patent document No. FR 3042172 dated Apr. 14, 2017, https://patents.google.com/patent/FR3042172A1/en?oq=FR3042172, accessed on Jun. 22, 2020.

English translation of Japan patent document No. JP H0568800 dated Sep. 17, 1993, https://patents.google.com/patent/JPH0568800U/en?oq=jpH0568800, accessed on Jun. 22, 2020.

English translation of Japan patent document No. JP H0582337 dated Nov. 9, 1993, https://patents.google.com/patent/JPH0582337U/en?oq=jpH0582337, accessed on Jun. 22, 2020.

English translation of Japan patent document No. JP H07250729 dated Oct. 3, 1995, https://patents.google.com/patent/JPH07250729A/en?oq=jpH07250729, accessed on Jun. 22, 2020.

English translation of Japan patent document No. JP2015012909 dated Jan. 22, 2015, https://patents.google.com/patent/JP2015012909A/en?oq=jp2015012909, accessed on Jun. 22, 2020.

English translation of international patent document No. WO 2008083952 dated Jul. 17, 2008, https://patents.google.com/patent/WO2008083952A1/en?oq=WO2008083952, accessed on Jun. 22, 2020.

English translation of international patent document No. WO 2015136735 dated Sep. 17, 2015, https://patents.google.com/patent/WO2015136735A1/en?oq=WO2015136735, accessed on Jun. 22, 2020.

English translation of Europe patent document No. EP 1230876 dated Aug. 14, 2002, https://patents.google.com/patent/EP1230876A1/en?oq=EP1230876, accessed on Jun. 22, 2020.

\* cited by examiner

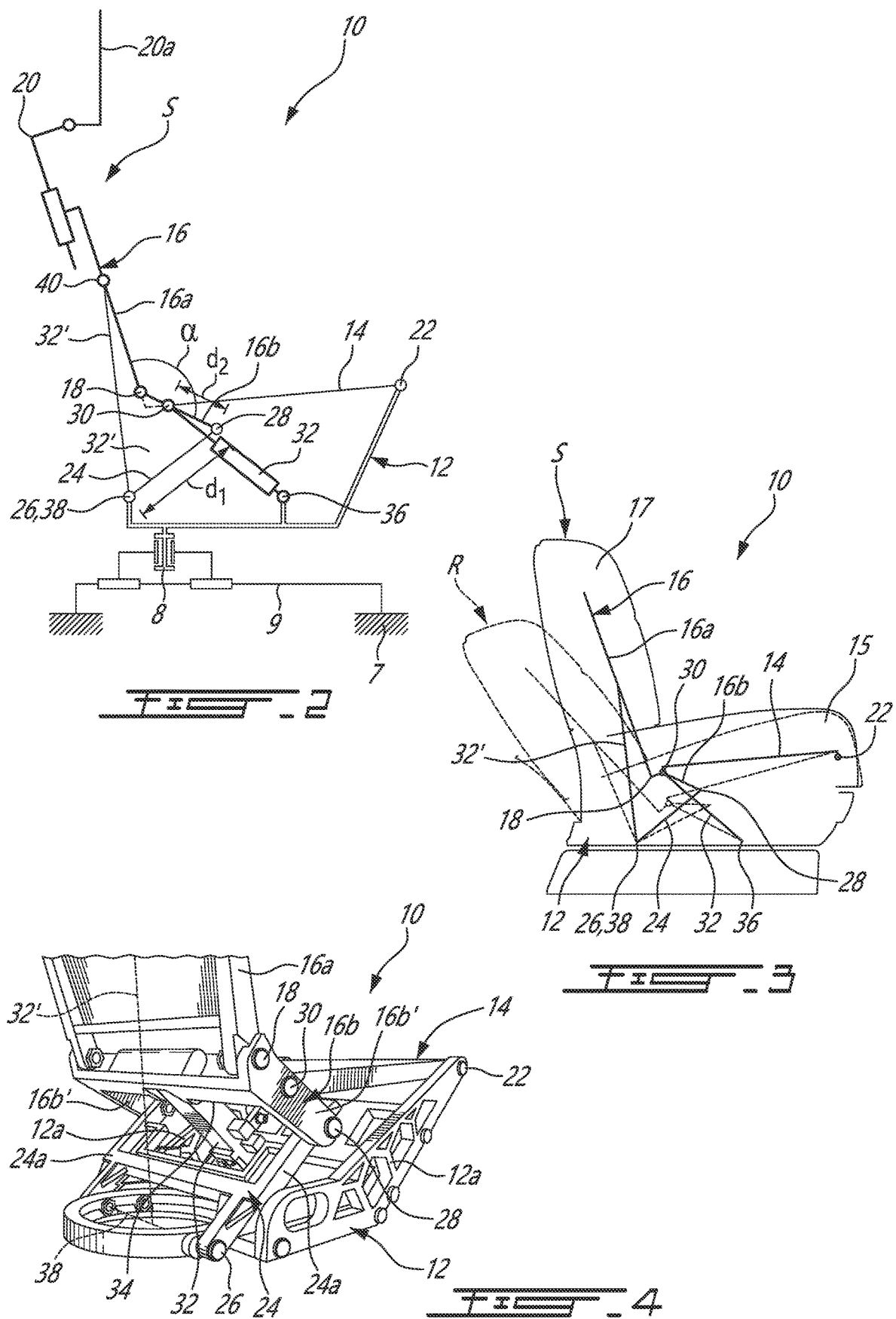

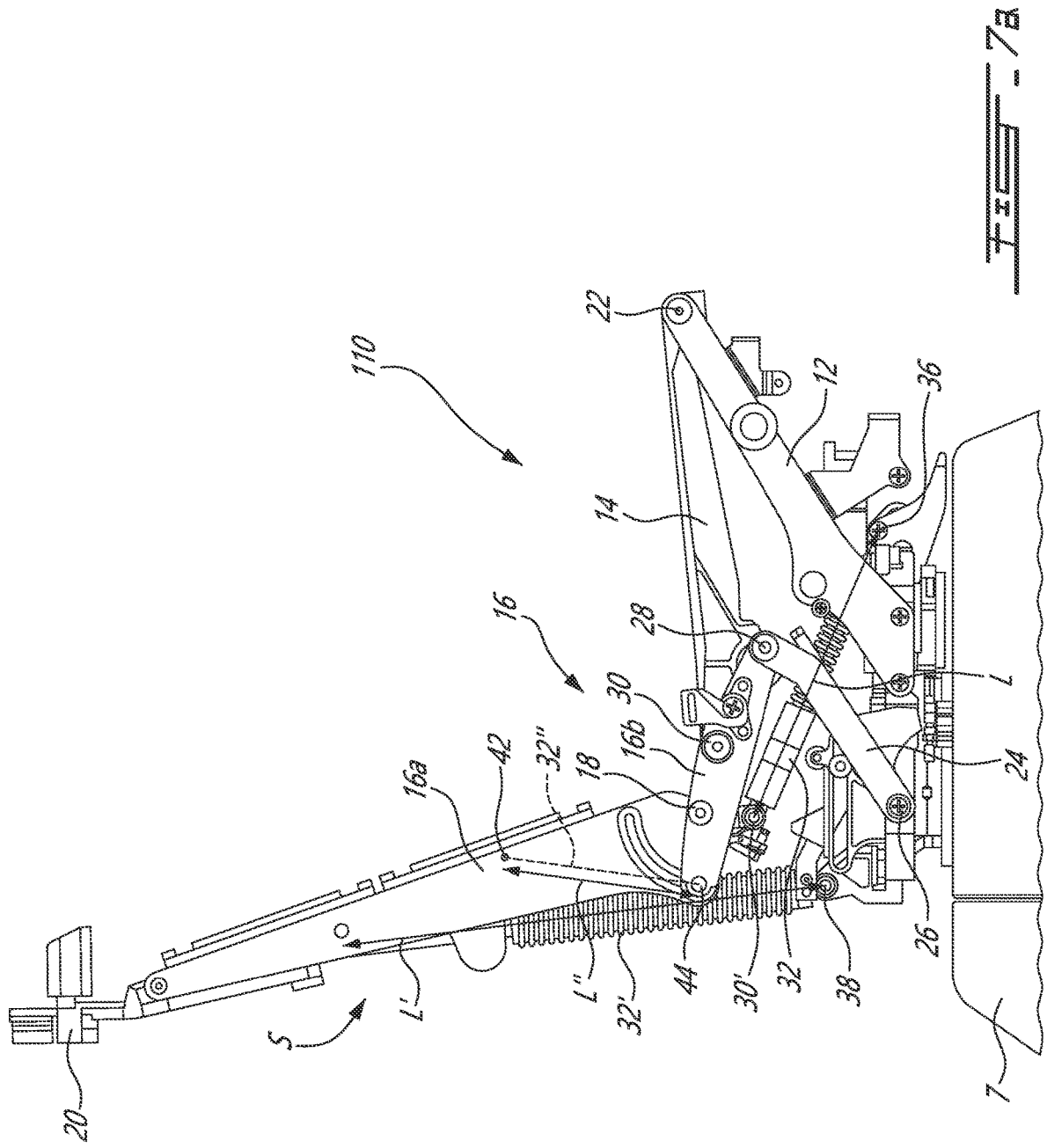

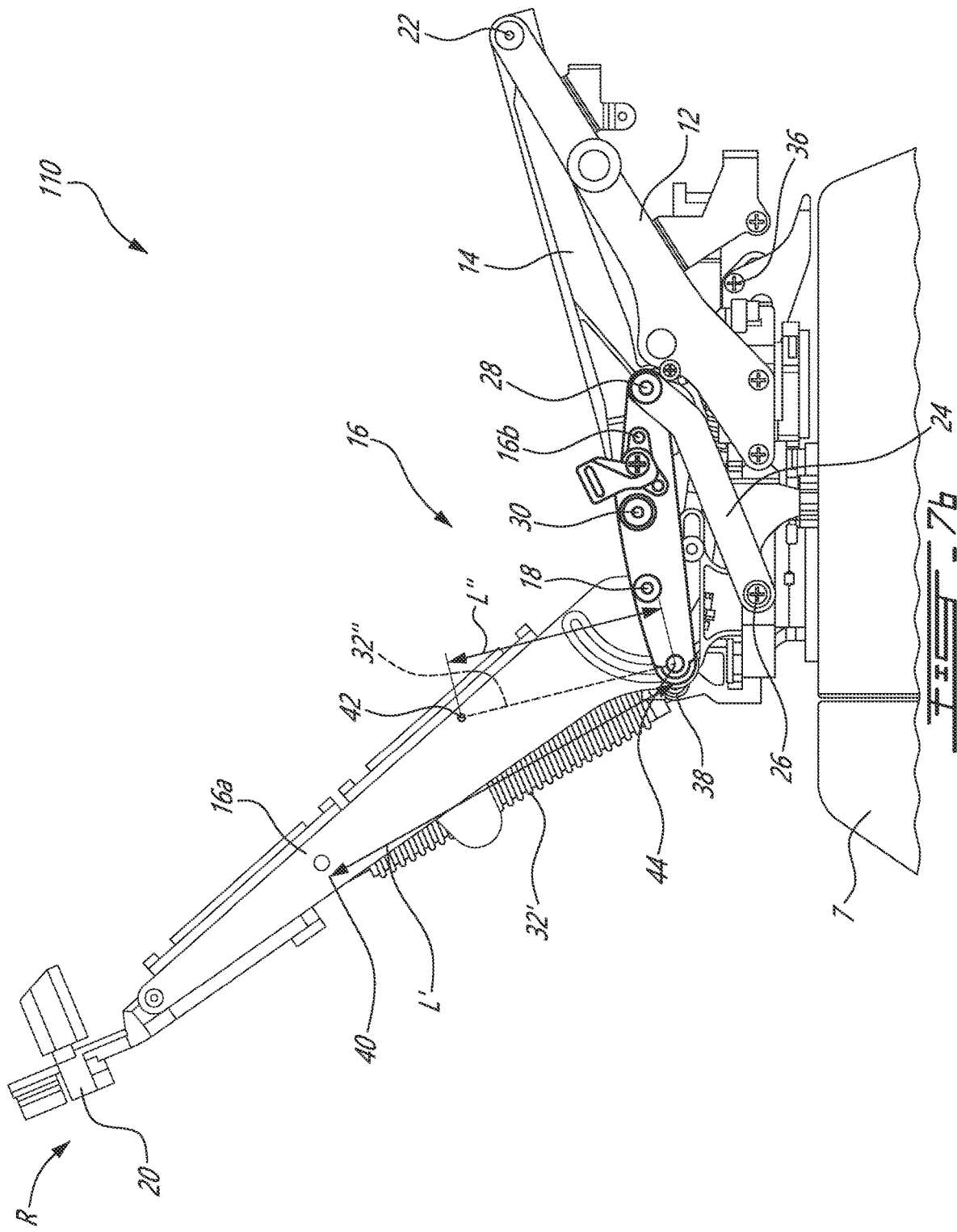

RECLINABLE SEAT WITH MULTIPLE CONFIGURATIONS

CROSS-REFERENCE TO RELATED APPLICATIONS

The present application claims priority to U.S. Patent Application No. 63/253,771 filed Oct. 8, 2021, the entire contents of which are incorporated by reference herein.

Reference is also made to U.S. patent application Ser. No. 16/955,572 filed Dec. 18, 2018, now granted as U.S. Pat. No. 11,186,374, the entire contents of which are incorporated by reference herein.

TECHNICAL FIELD

The application relates generally to reclinable seats and, more particularly, to such seats provided in an aircraft.

BACKGROUND

A variety of different configurations exist for reclinable seats such as to allow the backrest and seat pan to move from a sitting configuration to either a reclined configuration or a fully flat configuration. Some of these existing seats include slide mechanisms, for example provided between the base of the seat and the backrest and/or the seat pan, where rollers or other suitable sliding elements are received in straight or curved slots to guide the motion of the backrest and/or the seat pan with respect to the base. However, slide mechanisms may be prone to misalignment and/or jamming, forcing the occupant to return the seat to a previous configuration before configuring the seat in a desired configuration.

SUMMARY

There is disclosed a reclinable passenger seat comprising: a base configured to be connected to a floor structure; a seat pan frame supporting a seat pan and having a front end connected to the base via a first fixed pivot; a support arm having one end connected to the base via a second fixed pivot located rearward of the first fixed pivot; a backrest frame having an upper backrest member supporting a backrest and a lower backrest member extending away from the upper backrest member, an opposed end of the support arm pivotally connected to the lower backrest member at a first location spaced from the upper backrest member, a rear end of the seat pan frame pivotally connected to the lower backrest member at a second location between the first location and the upper backrest member; a seat pan linear actuator having a rear end pivotally connected to the rear end of the seat pan frame proximate to the second location, and a front end pivotally connected to the base by a third fixed pivot located between the first and second fixed pivots; and a backrest linear actuator having an upper end pivotally connected to the upper backrest member, and a lower end pivotally connected to the base by a fourth fixed pivot, a length of the backrest linear actuator defined between the upper and lower ends; wherein the backrest frame and seat pan frame are configured to move simultaneously between at least a reclined configuration and a berth configuration through pivoting motion about the first and second fixed pivots and about the first and second locations, the length of the backrest linear actuator being substantially the same in the reclined configuration and in the berth configuration.

The reclinable passenger seat as defined above and described herein may further include one or more of the following features, in whole or in part, and in any combination.

In certain aspects, the fourth fixed pivot is located closer to the second fixed pivot than to the third fixed pivot.

In certain aspects, the fourth fixed pivot is located rearward and upward of the second fixed pivot.

In certain aspects, the second fixed pivot and the fourth fixed pivot are coaxial.

In certain aspects, a length of the seat pan linear actuator defined between the rear end and the front end of the seat pan linear actuator is greater in the berth configuration than in the reclined configuration.

In certain aspects, the seat pan linear actuator remains forward of the backrest linear actuator as the backrest frame and the seat pan frame move between the reclined configuration and the berth configuration.

In certain aspects, the backrest linear actuator remains rearward of the seat pan frame as the backrest frame and the seat pan frame move between the reclined configuration and the berth configuration.

In certain aspects, the backrest frame and the seat pan frame are configured to move simultaneously between the reclined configuration and a sitting configuration through pivoting motion about the first and second fixed pivots and about the first and second locations, whereas the length of the backrest linear actuator is greater in the sitting configuration than in the reclined configuration.

In certain aspects, a length of the seat pan linear actuator defined between the rear end and the front end of the seat pan linear actuator is greater in the berth configuration than in the reclined configuration, and the length of the seat pan linear actuator is greater in the sitting configuration than in the reclined configuration.

In certain aspects, a length of the seat pan linear actuator defined between the rear end and the front end of the seat pan linear actuator is greater in the berth configuration than in the reclined configuration, and the length of the seat pan linear actuator is greater in the berth configuration than in the sitting configuration.

In certain aspects, a headrest is connected to the upper backrest member at a location spaced away from the lower backrest member, the upper end of the backrest linear actuator connected to the upper backrest member at a location between the headrest and the lower backrest member.

In certain aspects, the upper end of the backrest linear actuator is closer to the headrest than to the lower backrest member.

In certain aspects, the seat pan linear actuator and the backrest linear actuator are gas springs.

In certain aspects, the backrest gas spring is fully compressed in the reclined configuration and in the berth configuration.

In certain aspects, the backrest gas spring forms a load-bearing support arm when fully compressed, the backrest gas spring supporting the backrest frame as the backrest frame moves between the reclined configuration and the berth configuration.

In certain aspects, the seat pan gas spring is fully extended in the berth configuration.

In certain aspects, the seat pan linear actuator and the backrest linear actuator are electrically-driven.

In certain aspects, a side linear actuator having an upper end pivotally connected to the upper backrest member and a lower end pivotally connected to the lower backrest member.

In certain aspects, the side linear actuator is a gas spring, the side linear actuator being more compressed in the berth configuration than in the reclined configuration.

There is also disclosed an aircraft comprising: a fuselage defining a cabin having a floor structure; a reclinable seat located inside the cabin, the reclinable seat including: a base connected to the floor structure; a seat pan frame supporting a seat pan and having a front end connected to the base via a first fixed pivot; a support arm having one end connected to the base via a second fixed pivot located rearward of the first fixed pivot; a backrest frame having an upper backrest member supporting a backrest and a lower backrest member extending away from the upper backrest member, an opposed end of the support arm pivotally connected to the lower backrest member at a first location spaced from the upper backrest member, a rear end of the seat pan frame pivotally connected to the lower backrest member at a second location between the first location and the upper backrest member; a seat pan linear actuator having a rear end pivotally connected to the lower backrest member and to the rear end of the seat pan frame at the first location, and a front end pivotally connected to the base by a third fixed pivot located between the first and second fixed pivots; and a backrest linear actuator having an upper end pivotally connected to the upper backrest member, and a lower end pivotally connected to the base by a fourth fixed pivot located rearward of the first fixed pivot, a length of the backrest linear actuator defined between the upper and lower ends; wherein the backrest frame and seat pan frame are configured to move simultaneously between at least a reclined configuration and a berth configuration through pivoting motion about the first and second fixed pivots and about the first and second locations, the length of the backrest linear actuator being substantially the same in the reclined configuration and in the berth configuration.

The aircraft as defined above and described herein may further include one or more of the following features, in whole or in part, and in any combination.

In certain aspects, the upper end of the backrest linear actuator is located over the base when the reclinable seat is in the reclined configuration and over the floor structure rearward of the base when the reclinable seat is in the berth configuration.

In certain aspects, a length of the seat pan linear actuator defined between the rear end and the front end of the seat pan linear actuator is greater in the berth configuration than in the reclined configuration.

In certain aspects, the backrest frame and the seat pan frame are configured to move simultaneously between the reclined configuration and a sitting configuration through pivoting motion about the first and second fixed pivots and about the first and second locations, whereas the length of the backrest linear actuator is greater in the sitting configuration than in the reclined configuration.

In certain aspects, the seat pan linear actuator and the backrest linear actuator are gas springs.

In certain aspects, the fourth fixed pivot is located closer to the second fixed pivot than to the third fixed pivot.

In certain aspects, the fourth fixed pivot is located rearward and upward of the second fixed pivot.

In certain aspects, the second fixed pivot and the fourth fixed pivot are coaxial.

In certain aspects, the seat pan linear actuator remains forward of the backrest linear actuator as the backrest frame and the seat pan frame move between the reclined configuration and the berth configuration.

In certain aspects, the backrest linear actuator remains rearward of the seat pan frame as the backrest frame and the seat pan frame move between the reclined configuration and the berth configuration.

In certain aspects, the backrest frame and the seat pan frame are configured to move simultaneously between the reclined configuration and a sitting configuration through pivoting motion about the first and second fixed pivots and about the first and second locations, whereas the length of the backrest linear actuator is greater in the sitting configuration than in the reclined configuration.

In certain aspects, the length of the seat pan linear actuator is greater in the sitting configuration than in the reclined configuration.

In certain aspects, the length of the seat pan linear actuator is greater in the berth configuration than in the sitting configuration.

In certain aspects, a headrest is connected to the upper backrest member at a location spaced away from the lower backrest member, the upper end of the backrest linear actuator connected to the upper backrest member at a location between the headrest and the lower backrest member.

In certain aspects, the upper end of the backrest linear actuator is closer to the headrest than to the lower backrest member.

In certain aspects, the seat pan linear actuator and the backrest linear actuator are gas springs.

In certain aspects, the backrest gas spring is fully compressed in the reclined configuration and in the berth configuration.

In certain aspects, the backrest gas spring forms a load-bearing support arm when fully compressed, the backrest gas spring supporting the backrest frame as the backrest frame moves between the reclined configuration and the berth configuration.

In certain aspects, the seat pan gas spring is fully extended in the berth configuration.

In certain aspects, the seat pan linear actuator and the backrest linear actuator are electrically-driven.

In certain aspects, a side linear actuator having an upper end pivotally connected to the upper backrest member and a lower end pivotally connected to the lower backrest member.

In certain aspects, the side linear actuator is a gas spring, the side linear actuator being more compressed in the berth configuration than in the reclined configuration.

There is further disclosed a method of displacing a reclinable seat in an aircraft, the method comprising: changing an angle between a seat pan of the seat and a backrest of the seat to pivot the backrest between any two of a sitting configuration, a reclined configuration and a berth configuration, by simultaneously: pivoting a front end of the seat pan about a first fixed location on a base of the seat, causing a support arm of the seat to pivot about a second fixed location on the base of the seat, the second fixed location being rearward of the first fixed location; pivoting the backrest relative to the support arm about a third location on a lower backrest member of the backrest; pivoting the backrest relative to a rear end of the seat pan about a fourth location on the lower backrest member; and pivoting the backrest relative to an upper end of a linear actuator about a fifth location on an upper backrest member of the backrest, causing a lower end of the linear actuator to pivot about a location on the base of the seat being rearward of the first fixed location.

The method as defined above and described herein may further include one or more of the following features, in whole or in part, and in any combination.

In certain aspects, the pivoting of the backrest relative to the upper end of the linear actuator causes a length of the linear actuator defined between the upper end and the lower end of the linear actuator to be minimized as the backrest pivots from the sitting configuration toward the berth configuration.

In certain aspects, the length of the linear actuator is maintained as the backrest is pivoted from the berth configuration to a reclined configuration.

In certain aspects, the pivoting of the backrest relative to the upper end of the linear actuator causes a length of the linear actuator defined between the upper end and the lower end of the linear actuator to be minimized as the backrest is pivoted from the sitting configuration toward the reclined configuration.

In certain aspects, the length of the linear actuator is maintained as the backrest is pivoted from the reclined configuration to the berth configuration.

In certain aspects, the method further includes pivoting the backrest from the reclined configuration to the berth configuration causes the upper end of the linear actuator to be displaced rearwardly relative to the lower end of the linear actuator.

In certain aspects, the method further includes pivoting the backrest to the sitting configuration from any one of the reclined configuration and the berth configuration upon the aircraft engaging in any one of taxi, take-off and landing.

BRIEF DESCRIPTION OF THE DRAWINGS

Reference is now made to the accompanying figures in which:

FIG. 2 is a schematic diagram of the structure of a seat which can be used in an aircraft such as shown in FIG. 1;

FIG. 3 is a schematic side view of the seat of FIG. 2 shown in sitting and reclined configurations, in accordance with a particular embodiment;

FIG. 4 is a schematic rear tridimensional view of part of the seat of FIGS. 2 and 3;

FIG. 7a is a schematic side view of a seat in accordance with another embodiment, in the sitting configuration;

FIG. 7b in a schematic side view of the seat of FIG. 7a in the reclined configuration.

DETAILED DESCRIPTION

Figure 1:
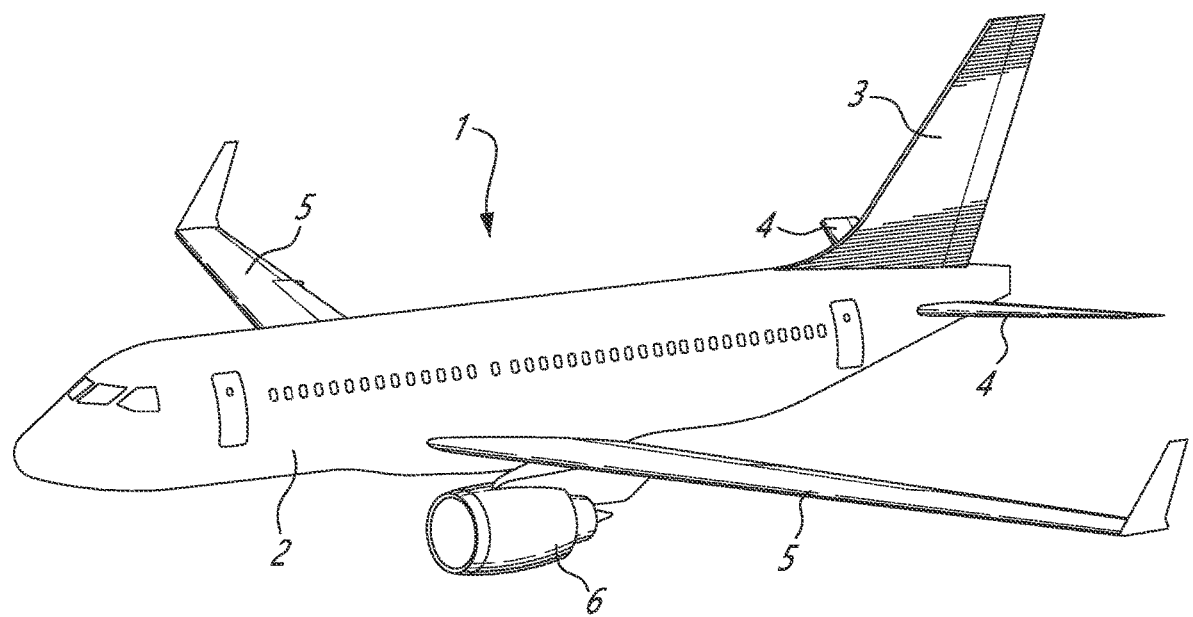
FIG. 1 is a schematic tridimensional view of an aircraft.

Referring to the drawings and more particularly to FIG. 1, an aircraft is shown at 1 and is generally described to illustrate some components for reference purposes in the present disclosure. The aircraft 1 has a fuselage 2 having a fore end at which a cockpit is located, and an aft end supporting a tail assembly, with a cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft. It is also understood that although FIG. 1 shows a commercial aircraft, the aircraft 1 may alternately be any other type of aircraft, including, but not limited to, a business aircraft or a private aircraft.

Referring to FIG. 2, a passenger seat 10 in accordance with a particular embodiment is shown. The passenger seat 10 is configured to be used, for example, in the cabin of an aircraft such as the aircraft 1 shown in FIG. 1. The passenger seat 10 could alternately be used in any other suitable type of vehicle, and may be used to seat or accommodate other people in the aircraft 1 that are not passengers.

Referring particularly to FIG. 2, the seat 10 includes a carrier or base 12 which is configured to be connected to a floor structure 7, for example to floor beams interconnected to the fuselage 2. In the embodiment shown, the base 12 is connected to a pivot 8 which is slidingly received on rails 9 attached to the floor structure 7, allowing the base 12 to be displaced along a limited path defined by the rails 9 and pivoted about the pivot 8. The pivot 8 is located toward the rear of the base 12, such that a greater part of the base 12 is located in front of the pivot 8. It is however understood that the attachment between the base 12 and floor structure 7 shown here is exemplary only and that any other suitable type of attachment may alternately be used, including, but not limited to, pivoting attachments, sliding attachments, and fixed attachments.

Referring particularly to FIG. 3, the seat 10 generally includes a seat pan frame 14 supporting a seat pan 15, and a backrest frame 16 supporting a backrest 17. It is understood that the seat pan 15 and the backrest 17 may include any material suitable for providing appropriate support and comfort to the occupant, including, but not limited to, suitable cushioning materials which will not be further described herein. The seat 10 is selectively configurable between a sitting configuration S shown in full lines and a reclined configuration R shown in dotted lines. In the reclined configuration R, the backrest 17 may form an angle of 45 degrees with the vertical or horizontal, and the seat pan 15 may for an angle of 15 degrees with the horizontal. Hence, due to this angulation of the seat pan 15, the reclined configuration R may be characterized as a deep recline configuration of the seat 10. In the reclined configuration R, a rear end of the seat pan 15 sinks downward by about 5 inches relative to a front end of the seat pan 15. In a particular embodiment, the sitting configuration S, also shown in FIG. 6a, corresponds to a taxi, take-off and landing (TTOL) configuration.

Referring to FIGS. 2-4, the backrest frame 16 has an upper backrest member 16a supporting the backrest 17, and a lower backrest member 16b extending downwardly from a bottom end of the upper backrest member 16a. In the embodiment shown, the upper and lower backrest members 16a, 16b are pivotally interconnected by a selectively lockable pivot connection 18, e.g. a selectively lockable revolute joint. In the present disclosure, including the claims, the term "revolute joint" is intended to designate a pivot connection between two members which allows relative pivoting motion between the two members about an axis of rotation without allowing relative translation between the two members, i.e. the axis of rotation has a fixed location with respect to each of the two members. Examples of revolute joints include, but are not limited to, a hinge joint, a pin joint, and a folding joint.

The pivot connection 18 between the upper and lower backrest members 16a, 16b has a locked configuration where a relative pivoting motion between the upper and lower backrest members 16a, 16b is prevented and an unlocked configuration where the relative pivoting motion between the upper and lower backrest members 16a, 16b is allowed. The pivot connection 18 may include, for example, a lock based on a spring-loaded plunger mechanism; any other suitable mechanism may alternately be used. As will be detailed further below, in a particular embodiment the upper and lower backrest members 16a, 16b remain with a fixed relative orientation with respect to one another (i.e. the pivot connection 18 between the upper and lower backrest members 16a, 16b remains in the locked configuration) as the seat 10 is moved from the sitting configuration S to the reclined configuration R, and from the reclined configuration R to the sitting configuration S. The pivot connection 18 is only unlocked when the seat 10 is moved to a berth configuration B (FIG. 6c). In the embodiment shown, the upper and lower backrest members 16a, 16b are non-parallel when in the locked configuration. It is understood that in an alternate embodiment, the upper and lower backrest members 16a, 16b may be rigidly interconnected.

Referring particularly to FIG. 2, in the embodiment shown, the backrest 17 also includes a headrest 20 which is slidingly engaged to a top or upper end of the upper backrest member 16a. The headrest 20 may include a pivotable portion 20a allowing for further adjustment of the position of the headrest 20. It is understood that the headrest configuration shown is exemplary only, and that any other suitable headrest configuration may alternately be used; alternately, the adjustable headrest 20 may be omitted.

The front end of the seat pan frame 14 is connected to the front of the base 12 via a pivot connection 22, which in the embodiment shown is defined by a revolute joint or fixed pivot, i.e. a pivot having a fixed location on the base 12. The pivot connection 22 is vertically-stable, i.e., remains at a same height with the front end of the seat pan 15 relative to the floor structure 7 throughout the movement of the seat to and from any of the sitting, reclined and berth configurations S, R, B. Referring particularly to FIG. 4, in a particular embodiment, the base 12 includes two laterally spaced interconnected base portions 12a; the front end of the seat pan frame 14 is received between the front ends of the base portions 12a and is pivotally connected thereto. The pivot connection 22 may be defined by a single pivot interconnecting the front end of the seat pan frame 14 to both base portions 12a, or by separate pivots interconnecting the front end of the seat pan frame 14 to each base portion 12a. Other configurations are also possible.

Referring to FIGS. 2-4, the backrest frame 16 is connected to the base 12 by a support arm 24 and is free of direct connections with the base 12. The support arm 24 has one end connected to the base 12 via another pivot connection 26, which in the embodiment shown is also defined as a fixed pivot or revolute joint. The pivot connection 26 between the support arm 24 and the base 12 is located rearward of the pivot connection 22 between the front end of the seat pan frame 14 and the base 12 and, in the embodiment shown, is located at the rear of the base 12. The pivot connection 22 between the front end of the seat pan frame 14 and the base 12 is upwardly offset with respect to the pivot connection 26 between the support arm 24 and the base 12.

The support arm 24 has an opposed end pivotally connected to the lower backrest member 16b by another pivot connection 28 defined at a location spaced from the upper backrest member 16a. In the embodiment shown, the pivot connection 28 between the support arm 24 and the lower backrest member 16b is defined by another revolute joint.

Referring particularly to FIG. 4, in a particular embodiment, the support arm 24 includes two laterally spaced interconnected rods 24a, and the lower backrest member 16b includes two laterally spaced interconnected portions 16b'. The pivot connection 28 between the support arm 24 and the lower backrest member 16b is defined by separate pivots interconnecting the end of each of the lower backrest member portions 16b' to the end of a respective one of the rods 24a, and the pivot connection 26 between the support arm 24 and the base 12 is defined by separate pivots interconnecting the other end of each of the rods 24a to the base 12. Other configurations are also possible.

Referring to FIGS. 2-4, the backrest frame 16 and seat pan frame 14 are also interconnected: the rear end of the seat pan frame 14 is pivotally connected to the lower backrest member 16b by another pivot connection 30 defined at a location between the upper backrest member 16a and the pivot connection 28 between the support arm 24 and the lower backrest member 16b. In the embodiment shown, the pivot connection 30 between the lower backrest member 16b and the rear end of the seat pan frame 14 is defined by another revolute joint. Referring particularly to FIG. 4, in a particular embodiment, the pivot connection 30 between the lower backrest member 16b and the seat pan frame 14 is defined by a single pivot interconnecting both lower backrest member portions 16b' to the rear end of the seat pan frame 14. Other configurations are also possible.

Referring to FIG. 3, the backrest frame 16 and seat pan frame 14 move simultaneously between the sitting configuration S and the reclined configuration R through pivoting motion about the four pivot connections 22, 26, 28, 30 defined between the seat pan frame 14 and the base 12, between the support arm 24 and the base 12, between the support arm 24 and the lower backrest member 16b, and between the lower backrest member 16b and the seat pan frame 14, while the upper and lower backrest members 16a, 16b remain at a fixed orientation with respect to one another, e.g. while the pivot connection 18 between the upper and lower backrest members 16a, 16b remains in the locked configuration.

It can be seen that the pivot connection 26 between the support arm 24 and the base 12 is located under the backrest frame 16, and the backrest frame 16 remains over this pivot connection 26 throughout the motion of backrest frame 16 and seat pan frame 14 between the sitting and reclined configurations S, R. The support arm 24 also remains under the backrest frame 16, and the two pivot connections 28, 30 of the lower backrest member 16b remain forward of and higher than the pivot connection 26 between the support arm 24 and the base 12 throughout this motion.

Referring to FIG. 2, in a particular embodiment, an effective length $d_1$ of the support arm 24 defined by the distance between the two pivot connections 26, 28 of the support arm 24, an effective length $d_2$ of the lower backrest member 16b defined by the distance between the two pivot connections 28, 30 of the lower backrest member 16b, and an angle α between the upper and lower backrest members 16a, 16b when in the locked configuration are selected so that the variation in the angle of the backrest 17 has a linear relationship with respect to a variation in the angle of the seat pan 15 as the seat pan frame 14 and backrest frame 16 are moved between the sitting and reclined configurations S, R.

Figure 5:
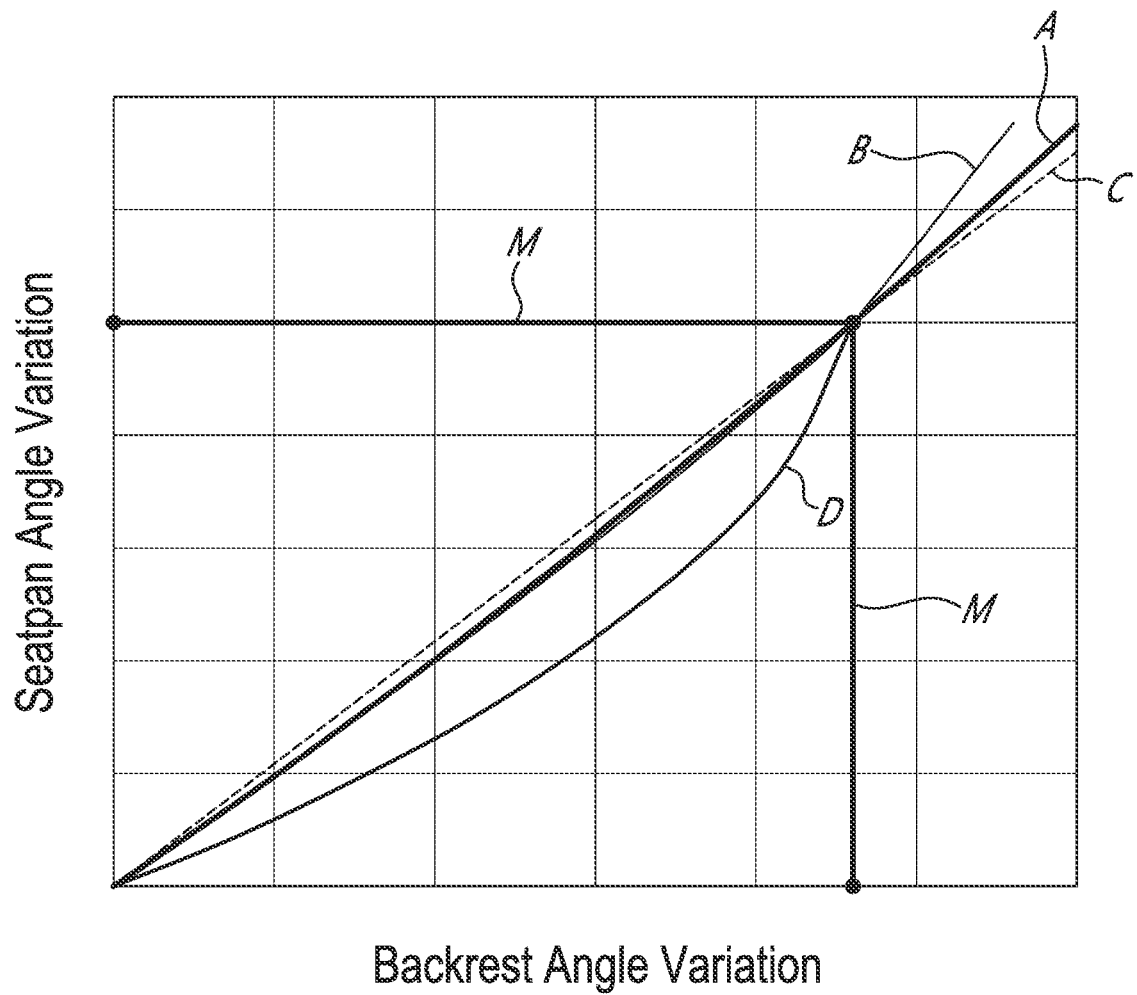
FIG. 5 is a diagram of an angle variation of the seat pan in relation to an angle variation of the backrest of the seat of FIGS. 2 to 4 upon movement between the sitting and reclined configurations.

FIG. 5 shows examples of the angle variation of the seat pan 15 in relation to the angle variation of the backrest 17 for different seat configurations, with lines M showing maximum targeted variations. Curve A shows a theoretical linear relationship, while curves B and C show relationships which are sufficiently close to the theoretical linear relationship A to be characterized as linear. In a particular embodiment, curve B corresponds to the seat 10 of FIGS. 2-4 where the effective length d1 of the support arm 24 is twice or about twice the effective length d2 of the lower backrest member 16b, and where the upper and lower backrest members 16a, 16b extend at an angle α of 135 degrees or about 135 degrees to each other in the locked configuration. In another embodiment, the effective length d1 of the support arm 24 is about 1.875 times the effective length d2 of the lower backrest member 16b with the angle α being 135 degrees or about 135 degrees. In a particular embodiment, the effective length d2 of the lower backrest member 16b is about ¼ the length of the seat pan frame 14 as measured between its pivot connections 22, 30, and the effective length d1 of the support arm 24 is from 1.875 to 2 times the effective length d2 of the lower backrest member 16b with the angle α being 135 degrees or about 135 degrees. In a particular embodiment, all these combinations of values are applicable for a seat pan depth of 16 inches, and a recline angle range of 5 to 15 degrees for the seat pan and 20 to 43 degrees for the backrest. Other values are also possible. By contrast, curve D shows a relationship which is not linear; in a particular embodiment, this corresponds to a seat where the upper and lower backrest members 16a, 16b are parallel or approximately parallel, and where the effective length d1 of the support arm 24 is more than twice the effective length d2 of the lower backrest member 16b. In a particular embodiment, the linear relationship between the variation in the angle of the seat pan 15 and the variation in the angle of the backrest 17 provides for a more stable motion between the sitting and reclined configurations S, R, which may be easier to operate and/or more comfortable for the occupant, then a seat where the relationship is not linear.

Referring back to FIG. 2, the seat 10 further includes a biasing and/or damping member, for example a gas spring, an electrically-driven linear actuator or any other suitable type of linear actuator located under the seat pan frame 14, referred to henceforth as a seat pan linear actuator 32. Having the seat pan linear actuator 32 located under the seat pan frame 14 as opposed to behind the seat pan frame 14 allows for the backrest 17 and other mobile components connected thereto to have a suitable range of motion, as will be described hereinbelow.

In the embodiment shown, the seat pan linear actuator 32 has a rear end pivotally connected to the lower backrest member 16b and to the rear end of the seat pan frame 14 at the pivot connection 30 between the lower backrest member 16b and the rear end of the seat pan frame 14. For example and referring to FIG. 4, the lower backrest member 16b and the rear end of the seat pan frame 14 may be interconnected by a revolute joint defined by a rod 34, with the lower backrest member portions 16b' and the rear end of the seat pan frame 14 pivotally engaged to the rod 34 adjacent its ends, and the rear end of the seat pan linear actuator 32 pivotally engaged to a central portion of the rod 34. Other configurations are of course possible.

Referring back to FIG. 2, the opposed, front end of the seat pan linear actuator 32 is pivotally connected to the base 12 by a pivot connection 36, which in the embodiment shown is also defined as a fixed pivot or revolute joint. The pivot connection 36 between the seat pan linear actuator 32 and the base 12 is located between the pivot connections 22, 26 of the base 12 with the front end of the seat pan frame 14 and with the support arm 24.

In a particular embodiment, the seat pan linear actuator 32 is positioned so that the movement of its rear end connected to the lower backrest member 16b and to the seat pan frame 14 is as close as possible to the axis of the seat pan linear actuator 32 so as to maximize the efficiency of the seat pan linear actuator 32. In a particular embodiment, the seat pan linear actuator 32 is selected so that its stroke during the motion of the seat pan frame 14 and backrest frame 16 is at most ⅓ of the total extended length of the seat pan linear actuator 32; other values are also possible.

In the embodiment shown, the front end of the seat pan linear actuator 32 is connected toward the front of the base 12, so that its connection with the base 12 remains forward of its connection with the lower backrest member 16b and seat pan frame 14 throughout the motion of backrest frame 16 and seat pan frame 14 between the sitting and reclined configurations S, R. It can be seen from FIG. 3 that the pivot connections 28, 30 of the lower backrest member 16b remain rearward of the pivot connection 36 between the seat pan linear actuator 32 and the base 12 as the backrest frame 16 and seat pan frame 14 move between the sitting configuration S and the reclined configuration R.

Referring to FIG. 2, the pivot connection 22, the pivot connection 26 and the pivot connection 36 may be respectively referred to as a first fixed pivot 22, a second fixed pivot 26 and a third fixed pivot 36. Another linear actuator referred to as a backrest linear actuator 32' is attached toward the rear of the base 12. Similarly to the seat pan linear actuator 32, the backrest linear actuator 32' is a biasing and/or damping member, for example a gas spring, an electrically-driven linear actuator or any other suitable type of linear actuator. The backrest linear actuator 32' has an upper end pivotally connected to the upper backrest member 16a, and a lower end pivotally connected to the base 12 via a fourth fixed pivot 38 located rearward of the third fixed pivot 36, at a location closer to the second fixed pivot 26 than to the third fixed pivot 36. In the depicted embodiment, the fourth fixed pivot 38 is also a revolute joint. Referring to FIG. 2, the second fixed pivot 26 and the fourth fixed pivot 38 are coaxial, such that the rear end of the support arm 24 and the lower end of the backrest linear actuator 32' are pivotable about a same axis. The upper end of the backrest linear actuator 32' connects to the upper backrest member 16a via a pivot connection 40 that is centrally-located, i.e., located closer to a longitudinal center of the upper backrest member 16a than to either ends thereof. Stated otherwise, the backrest linear actuator 32' connects to the upper backrest member 16a at a generally intermediate location between the headrest 20 and the lower backrest member 16b. In the depicted embodiment, the pivot connection 40 is also a revolute joint.

In FIG. 3, it can be observed that a length L' (FIG. 7c) of the backrest linear actuator 32' defined between the upper end and the lower end thereof is greater in the sitting configuration S than in the reclined configuration R. In the sitting configuration, the length L' of the backrest linear actuator 32' is at its maximum value. As the seat 10 moves from the sitting configuration S to the reclined configuration R, the backrest frame 16 pivots with the seat pan frame 14 about the first fixed pivot 22, causing the upper end of the backrest linear actuator 32' to move with the backrest frame 16 relative to the fourth fixed pivot 38, bringing the upper end of the backrest linear actuator 32' closer to the lower end thereof, thereby decreasing the length L' of the backrest linear actuator 32'. Upon the seat 10 reaching the reclined configuration R, the length L' of the backrest linear actuator 32' is minimal. Stated otherwise, the backrest linear actuator 32' is fully extended in the sitting configuration S and fully compressed in the reclined configuration R. Conversely, it can be observed that a length L' (FIG. 7c) of the seat pan linear actuator 32 defined between the front and rear ends thereof is greater in the sitting configuration S than in the reclined configuration R. Upon the seat 10 reaching the reclined configuration R, the length L' of the seat pan linear actuator 32 is minimal, i.e., the seat pan linear actuator 32 is fully compressed. As the seat 10 moves between the sitting configuration S and the reclined configuration R, the upper end of the backrest linear actuator 32' remains over the base 12.

Figure 6A:
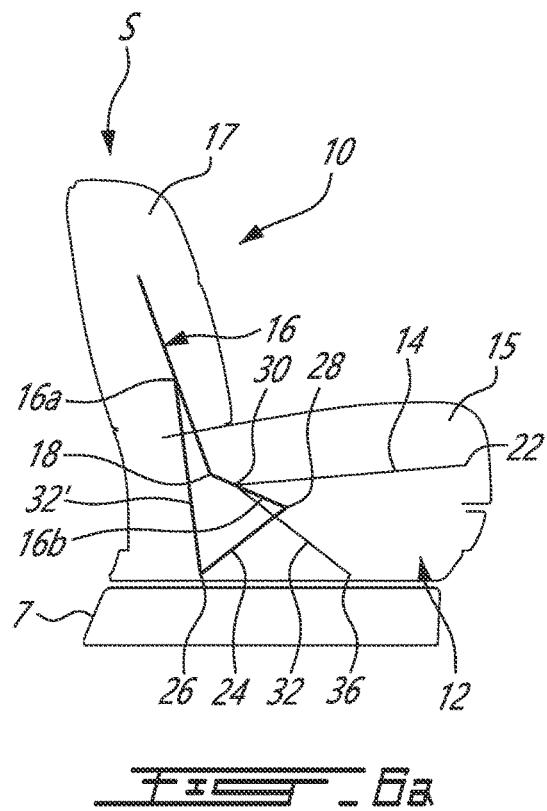
FIG. 6a is a schematic side view of the seat of FIGS. 2 to 4 in a sitting configuration.
Figure 6B:
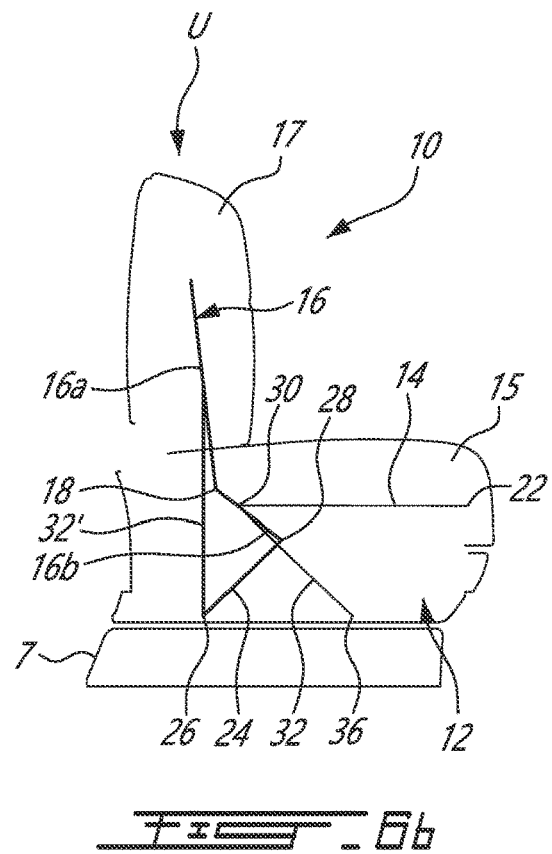
FIG. 6b in a schematic side view of the seat of FIG. 6a in an upright configuration.
Figure 6C:
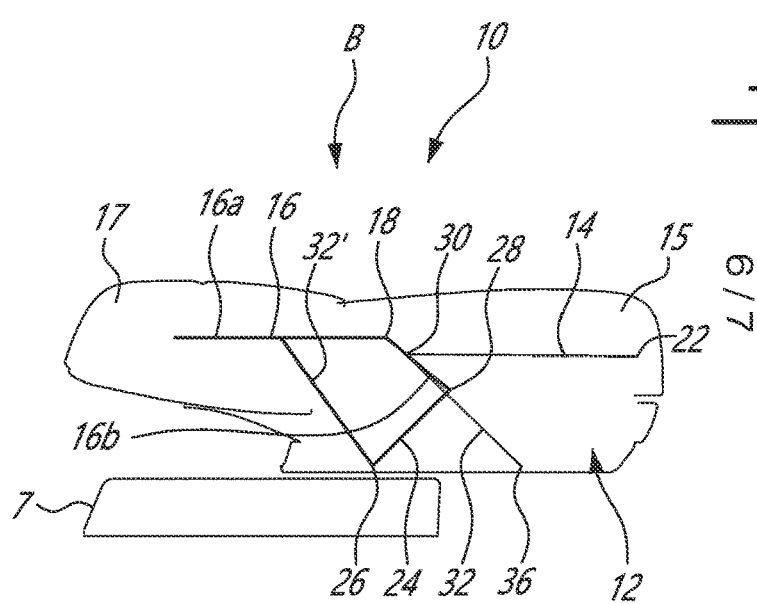
FIG. 6c is a schematic side view of the seat of FIG. 6a in a berth configuration.

Referring to FIGS. 6a-6c, in a particular embodiment the seat 10 also has an upright configuration U (FIG. 6b), where the backrest 17 is closer to the vertical (more upright) than in the sitting configuration S (FIG. 6a) and/or where the seat pan frame 14 is horizontal or approximately horizontal. The seat pan frame 14 and backrest frame 16 move simultaneously between the sitting configuration S (FIG. 6a) and the upright configuration U (FIG. 6b) through pivoting motion about the four pivot connections 22, 26, 28, 30 defined between the seat pan frame 14 and the base 12, between the support arm 24 and the base 12, between the support arm 24 and the lower backrest member 16b, and between the lower backrest member 16b and the seat pan frame 14, while the upper and lower backrest members 16a, 16b remain at a fixed orientation with respect to one another, e.g. while the pivot connection 18 between the upper and lower backrest members 16a, 16b remains in the locked configuration.

In embodiments, the seat 10 also has a berth configuration B (FIG. 6c), where the backrest 17 and seat pan 15 are aligned or approximately aligned, for example horizontally so that the seat 10 may serve as a bed. In the berth configuration B, the upper end of the backrest linear actuator 32' is located rearward of the base 12, over the floor structure 7. In the embodiment shown, the seat 10 is configured between the upright configuration U and the berth configuration B by unlocking the pivot connection 18 between the upper and lower backrest members 16a, 16b, and pivoting the upper backrest member 16a rearwardly with respect to the lower backrest member 16b about the unlocked pivot connection 18. The position of the support arm 24, seat pan frame 14 and lower backrest member 16b is the same between the upright configuration U (FIG. 6b) and the berth configuration B (FIG. 6c), i.e. the seat 10 is configured between the upright configuration U and the berth configuration B without any pivoting motion about the four pivot connections 22, 26, 28, 30 defined between the seat pan frame 14 and the base 12, between the support arm 24 and the base 12, between the support arm 24 and the lower backrest member 16b, and between the lower backrest member 16b and the seat pan frame 14. In an alternate embodiment, and as described in greater detail below, the seat 10 can be displaced directly to the berth configuration B by starting from any position between the sitting configuration S and the reclined configuration R, without having to transition first to either one of the sitting configuration S and the upright configuration U. In such a displacement of the seat 10, suitable pivoting motion about the four pivot connections 22, 26, 28, 30 may occur.

In the berth configuration B, the length L of the seat pan linear actuator 32 is maximized, i.e., fully extended. In the berth configuration B, the length L' of the backrest linear actuator 32' is minimized, i.e., fully compressed. Indeed, the length L' of the backrest linear actuator 32' is substantially the same in the reclined configuration R (FIG. 3) and in the berth configuration B (FIG. 6c). Hence, as the seat 10 moves between the reclined and berth configurations R, B, the backrest linear actuator 32' follows and supports the upper backrest member 16a, functioning as a load-bearing member and a fulcrum for the upper backrest member 16a to pivot thereabout.

Figure 7C:
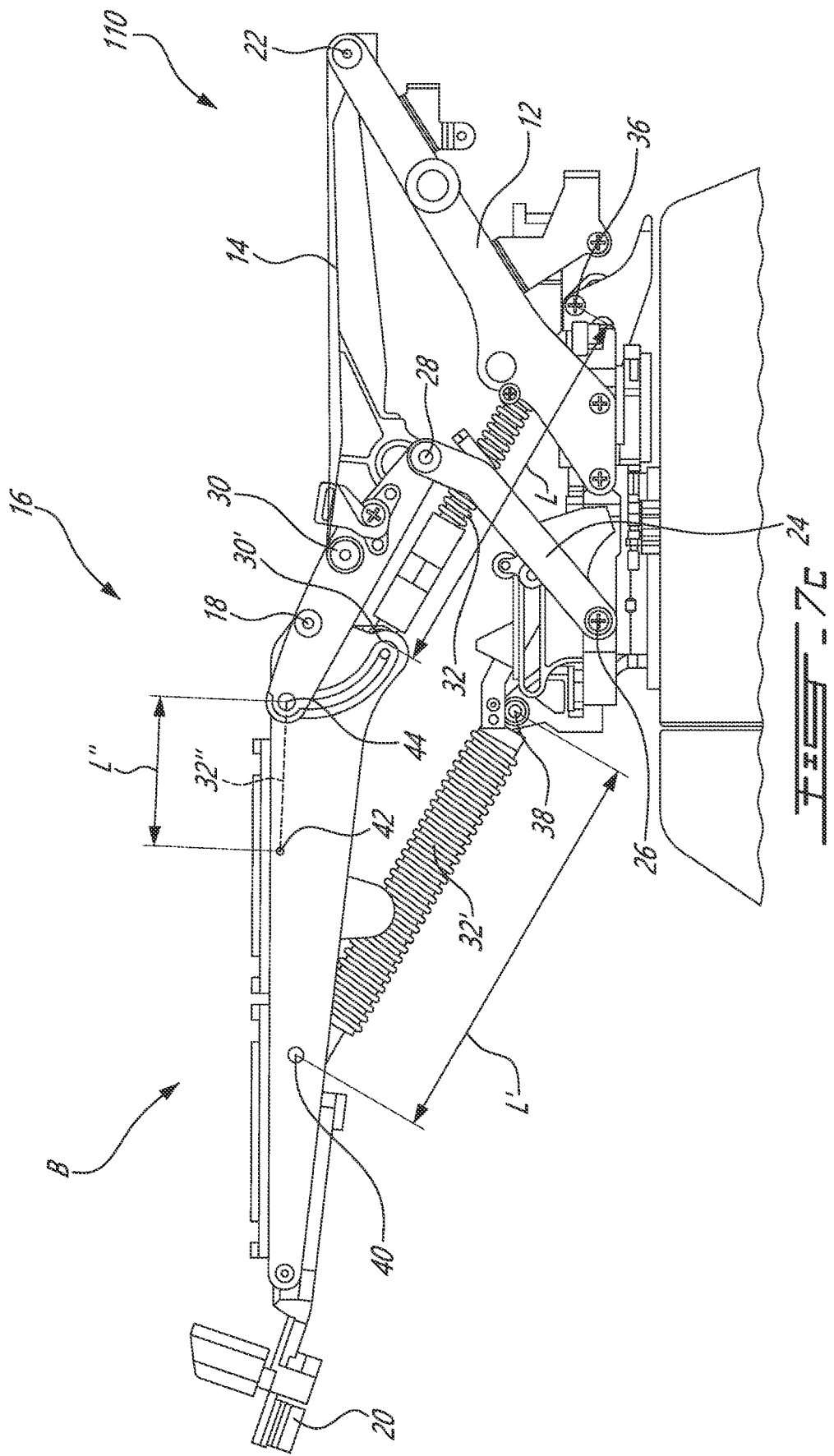
FIG. 7c is a schematic side view of the seat of FIG. 7a in the berth configuration.

Referring to FIGS. 7a, 7b and 7c, a seat 110 in accordance with another embodiment is shown, where elements similar to the corresponding elements of the seat 10 of FIGS. 2-4 and 6a-6c are identified by the same reference numerals and will not be further described herein. The seat 110 is shown in the sitting (FIG. 7a), reclined (FIG. 7b) and berth (FIG. 7c) configurations S, R, B.

It shall be noted that the individual positions of the seat pan frame 14, the upper backrest member 16a, the lower backrest member 16b and the support member 24 are different in each of the sitting, reclined and berth configurations S, R, B, and vary as the seat 10, 110 transitions therebetween. As the seat 10, 110 moves from the reclined configuration R (FIG. 7b) to the berth configuration B (FIG. 7c), the upper end and the lower end of the upper backrest member 16a respectively pivot downwardly and upwardly relative to the pivot connection 40. Urging the upper end of the upper backrest member 16a to pivot downwardly causes the lower backrest member 16b and the pivot connection 30 at the rear end of the seat pan frame 14 to move upwardly, thereby pivoting the seat pan frame 14 about the first fixed pivot 22 toward a horizontal orientation (FIG. 7c). The upward pivoting of the rear end of the seat pan frame 14 and the downward pivoting of the upper end of the upper backrest member 16a are further aided by the seat pan linear actuator 32 pushing against the rear end of the seat pan frame 14 as the seat pan linear actuator 32 extends to its fully extended length L in the berth configuration B. At least in some embodiments, throughout the movement between the reclined and berth configurations R, B, the seat pan linear actuator 32 remains forward of the backrest linear actuator 32', whereas the backrest linear actuator 32' remains rearward of the seat pan frame 14.

The dynamics of the seat 10, 100 moving to and fro any of the sitting, reclined and berth configurations S, R, B are controlled by the seat pan linear actuator 32 and the backrest linear actuator 32', exerting either impulsion or damping as the case may be. Moreover, in embodiments, the linear actuators 32, 32' are selectively lockable so as to bind the seat 10 in any given configuration, for example in transitory configurations other than the sitting, reclined and berth configurations S, R, B. One such transitory configuration is a neutral configuration (not shown), in which the pivot connection 18 is unlocked and both linear actuators 32, 32' are fully extended, such that the seat pan 15 is horizontal and the backrest 17 is at approximately 45 degrees from the vertical. In the neutral configuration, the seat 10, 110 can be rotated about the pivot 8 (FIG. 2) so as to face an adjacent seat to be used as an ottoman or as a bed extension.

In this embodiment, the rear end of the seat pan linear actuator 32 connects to the seat pan frame 14 at a pivot connection 30' (FIGS. 7a, 7c) located rearward of the pivot connection 30. The pivot connection 40, via which the upper end of the backrest linear actuator 32' connects to the upper backrest member 16a, is located closer to the headrest 20 than to the lower backrest member 16b. The fourth fixed pivot 38, via which the lower end of the backrest linear actuator 32' connects to the base 12, is located rearward and upward of the second fixed pivot 26.

The seat 110 further includes a pair of linear actuators referred to as side linear actuators 32" disposed on either side of the backrest frame 16. Similarly to the seat pan linear actuator 32, each one of the side linear actuators 32" is a biasing and/or damping members, for example a gas spring, an electrically-driven linear actuator or any other suitable type of linear actuator. Each side linear actuator 32" has an upper end pivotally connected to the upper backrest member 16a via a pivot connection 42, and a lower end pivotally connected to the lower backrest member 16b via a pivot connection 44 located rearward of the pivot connection 18. In this embodiment, the pivot connections 42, 44 are revolute joints. It shall be noted that a length L" (FIG. 7c) of each side linear actuator 32" defined between its upper and lower ends is longest in the sitting configuration S and shortest in the berth configuration B. Stated otherwise, the length L" of each side linear actuator 32" shortens, or compresses, as the seat 110 moves from the sitting configuration S to the reclined configuration R, and shortens, or compresses, further as the seat 110 moves from the reclined configuration R to the berth configuration B. Upon being in a compressed state, each side linear actuator 32" exerts opposed forces at either of its upper and lower ends, pushing upward against the upper backrest member 16a and pushing downward against the lower backrest member 16b. Provided that the pivot connection 18 is unlocked, the side linear actuators 32" assist in moving the seat 110 from the berth configuration B to the sitting configuration S. As it extends, each side linear actuator 32" urges the upper backrest member 16a to pivot forwardly and upwardly relative to the pivot connection 18, and simultaneously urges the lower backrest member 16b to pivot downwardly relative to the pivot connection 22 with the seat pan frame 14. This may help to position the seat 110 in a sitting configuration S or even an upright configuration in situations where the passenger gets up from the seat 110 while it is in the reclined or berthed configurations R,B, and while the pivot connection 18 is unlocked.

In a particular embodiment and in use, and referring to FIGS. 7a to 7c, reclining the seat 10, 110 includes changing the angle of the seat pan 15 and the angle of the backrest 17 by simultaneously pivoting the front end of the seat pan 15 about a first fixed location defined by the pivot connection 22 between the seat pan frame 14 and the base 12, pivoting the support arm 24 about a second fixed location defined by the pivot connection 26 between the support arm 24 and the base 12 and which is located aft of the first fixed location 22, pivoting the backrest 17 relative to the support arm 24 about a third location defined by the pivot connection 28 between the support arm 24 and the lower backrest member 16b, pivoting the backrest 17 relative to the rear end of the seat pan 15 about a fourth location defined by the pivot connection 30 between the seat pan frame 14 and the lower backrest member 16b, and pivoting the backrest 17 relative to the upper end of the backrest linear actuator 32' about a fifth location defined by the pivot connection 40 on the upper backrest member 16a, causing the lower end of the backrest linear actuator 32' to pivot about a location on the base 12 defined by the pivot connection 38 located rearward of the first fixed location.

In a particular embodiment, and referring to FIGS. 7a to 7c, pivoting the backrest 17 relative to the upper end of the backrest linear actuator 32' causes the length L' of the backrest linear actuator 32' defined between the upper end and the lower end of the backrest linear actuator 32' to be minimized as the backrest 17 pivots from the sitting configuration S toward the berth configuration B before the backrest 17 reaches the berth configuration B.

In a particular embodiment, the length L' of the backrest linear actuator 32' is maintained, or remains unchanged, as the backrest 17 is pivoted from the berth configuration B to the reclined configuration R.

In a particular embodiment, pivoting the backrest 17 relative to the upper end of the backrest linear actuator 32' causes the length L' of the backrest linear actuator 32' to be minimized as the backrest 17 is pivoted from the sitting configuration S toward the reclined configuration R.

In a particular embodiment, the length L' of the backrest linear actuator 32' is maintained as the backrest 17 is pivoted from the reclined configuration R to the berth configuration B.

In a particular embodiment, pivoting the backrest 17 from the reclined configuration R to the berth configuration B causes the upper end of the backrest linear actuator 32' to be displaced rearwardly relative to the lower end of the backrest linear actuator 32'.

In a particular embodiment, reclining the seat 10, 110 further includes pivoting the backrest 17 to the sitting configuration S from any one of the reclined configuration R and the berth configuration B upon the aircraft 1 being in one or more of the taxi, take-off or landing phases.

In a particular embodiment, the configuration of the pivot connections 22, 26, 28, 30 allows for the motion of the seat 10, 110 to be easier and/or more comfortable when compared to a similar seat having one or more sliding mechanism(s) involved in the motion of the seat. In a particular embodiment, the configuration of the pivot connections 22, 26, 28, 30 allows for a range of motion for the seat 10, 110 similar to that of a seat having one or more sliding mechanism(s).

While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A reclinable passenger seat comprising:
a base configured to be connected to a floor structure;
a seat pan frame supporting a seat pan and having a front end connected to the base via a first fixed pivot;
a support arm having one end connected to the base via a second fixed pivot located rearward of the first fixed pivot;
a backrest frame having an upper backrest member supporting a backrest and a lower backrest member extending away from the upper backrest member, an opposed end of the support arm pivotally connected to the lower backrest member at a first location spaced from the upper backrest member, a rear end of the seat pan frame pivotally connected to the lower backrest member at a second location between the first location and the upper backrest member;
a seat pan linear actuator having a rear end pivotally connected to the rear end of the seat pan frame proximate to the second location, and a front end pivotally connected to the base by a third fixed pivot located between the first and second fixed pivots; and
a backrest linear actuator having an upper end pivotally connected to the upper backrest member, and a lower end pivotally connected to the base by a fourth fixed pivot, a length of the backrest linear actuator defined between the upper and lower ends;
wherein the backrest frame and seat pan frame are configured to move simultaneously between at least a reclined configuration and a berth configuration through pivoting motion about the first and second fixed pivots and about the first and second locations, the length of the backrest linear actuator being substantially the same in the reclined configuration and in the berth configuration.

2. The reclinable passenger seat of claim 1, wherein the fourth fixed pivot is located closer to the second fixed pivot than to the third fixed pivot.

3. The reclinable passenger seat of claim 1, wherein the fourth fixed pivot is located rearward and upward of the second fixed pivot.

4. The reclinable passenger seat of claim 1, wherein the second fixed pivot and the fourth fixed pivot are coaxial.

5. The reclinable passenger seat of claim 1, wherein a length of the seat pan linear actuator defined between the rear end and the front end of the seat pan linear actuator is greater in the berth configuration than in the reclined configuration.

6. The reclinable passenger seat of claim 1, wherein the seat pan linear actuator remains forward of the backrest linear actuator as the backrest frame and the seat pan frame move between the reclined configuration and the berth configuration.

7. The reclinable passenger seat of claim 1, wherein the backrest linear actuator remains rearward of the seat pan frame as the backrest frame and the seat pan frame move between the reclined configuration and the berth configuration.

8. The reclinable passenger seat of claim 1, wherein the backrest frame and the seat pan frame are configured to move simultaneously between the reclined configuration and a sitting configuration through pivoting motion about the first and second fixed pivots and about the first and second locations, whereas the length of the backrest linear actuator is greater in the sitting configuration than in the reclined configuration.

9. The reclinable passenger seat of claim 8, wherein a length of the seat pan linear actuator defined between the rear end and the front end of the seat pan linear actuator is greater in the berth configuration than in the reclined configuration, and the length of the seat pan linear actuator is greater in the sitting configuration than in the reclined configuration.

10. The reclinable passenger seat of claim 8, wherein a length of the seat pan linear actuator defined between the rear end and the front end of the seat pan linear actuator is greater in the berth configuration than in the reclined configuration, and the length of the seat pan linear actuator is greater in the berth configuration than in the sitting configuration.

11. The reclinable passenger seat of claim 1, further comprising a headrest connected to the upper backrest member at a location spaced away from the lower backrest member, the upper end of the backrest linear actuator connected to the upper backrest member at a location between the headrest and the lower backrest member.

12. The reclinable passenger seat of claim 11, wherein the upper end of the backrest linear actuator is closer to the headrest than to the lower backrest member.

13. The reclinable passenger seat of claim 1, wherein the seat pan linear actuator and the backrest linear actuator are gas springs.

14. The reclinable passenger seat of claim 13, wherein the backrest gas spring is fully compressed in the reclined configuration and in the berth configuration.

15. The reclinable passenger seat of claim 14, wherein the backrest gas spring forms a load-bearing support arm when fully compressed, the backrest gas spring supporting the backrest frame as the backrest frame moves between the reclined configuration and the berth configuration.

16. The reclinable passenger seat of claim 13, wherein the seat pan gas spring is fully extended in the berth configuration.

17. The reclinable passenger seat of claim 1, wherein the seat pan linear actuator and the backrest linear actuator are electrically-driven.

18. The reclinable passenger seat of claim 1, comprising a side linear actuator having an upper end pivotally connected to the upper backrest member and a lower end pivotally connected to the lower backrest member.

19. The reclinable passenger seat of claim 18, wherein the side linear actuator is a gas spring, the side linear actuator being more compressed in the berth configuration than in the reclined configuration.

20. An aircraft comprising:
a fuselage defining a cabin having a floor structure;
a reclinable seat located inside the cabin, the reclinable seat including:
a base connected to the floor structure;
a seat pan frame supporting a seat pan and having a front end connected to the base via a first fixed pivot;
a support arm having one end connected to the base via a second fixed pivot located rearward of the first fixed pivot;
a backrest frame having an upper backrest member supporting a backrest and a lower backrest member extending away from the upper backrest member, an opposed end of the support arm pivotally connected to the lower backrest member at a first location spaced from the upper backrest member, a rear end of the seat pan frame pivotally connected to the lower backrest member at a second location between the first location and the upper backrest member;
a seat pan linear actuator having a rear end pivotally connected to the lower backrest member and to the rear end of the seat pan frame at the first location, and a front end pivotally connected to the base by a third fixed pivot located between the first and second fixed pivots; and
a backrest linear actuator having an upper end pivotally connected to the upper backrest member, and a lower end pivotally connected to the base by a fourth fixed pivot located rearward of the first fixed pivot, a length of the backrest linear actuator defined between the upper and lower ends;
wherein the backrest frame and seat pan frame are configured to move simultaneously between at least a reclined configuration and a berth configuration through pivoting motion about the first and second fixed pivots and about the first and second locations, the length of the backrest linear actuator being substantially the same in the reclined configuration and in the berth configuration.

21. The aircraft of claim 20, wherein the upper end of the backrest linear actuator is located over the base when the reclinable seat is in the reclined configuration and over the floor structure rearward of the base when the reclinable seat is in the berth configuration.

22. The aircraft of claim 20, wherein a length of the seat pan linear actuator defined between the rear end and the front end of the seat pan linear actuator is greater in the berth configuration than in the reclined configuration.

23. The aircraft of any claim 20, wherein the backrest frame and the seat pan frame are configured to move simultaneously between the reclined configuration and a sitting configuration through pivoting motion about the first and second fixed pivots and about the first and second locations, whereas the length of the backrest linear actuator is greater in the sitting configuration than in the reclined configuration.

24. The aircraft of claim 20, wherein the seat pan linear actuator and the backrest linear actuator are gas springs.

25. The aircraft of claim 20, wherein the fourth fixed pivot is located closer to the second fixed pivot than to the third fixed pivot.

26. The aircraft of claim 20, wherein the fourth fixed pivot is located rearward and upward of the second fixed pivot.

27. The aircraft of claim 20, wherein the second fixed pivot and the fourth fixed pivot are coaxial.

28. The aircraft of claim 20, wherein the seat pan linear actuator remains forward of the backrest linear actuator as the backrest frame and the seat pan frame move between the reclined configuration and the berth configuration.

29. The aircraft of claim 20, wherein the backrest linear actuator remains rearward of the seat pan frame as the backrest frame and the seat pan frame move between the reclined configuration and the berth configuration.

30. The aircraft of claim 20, wherein the backrest frame and the seat pan frame are configured to move simultaneously between the reclined configuration and a sitting configuration through pivoting motion about the first and second fixed pivots and about the first and second locations, whereas the length of the backrest linear actuator is greater in the sitting configuration than in the reclined configuration.

* * * * *